June 29, 1926.
W. NATISCH
1,590,902
UNIVERSAL GEAR SPEED TRANSFORMER
Filed Dec. 31, 1924
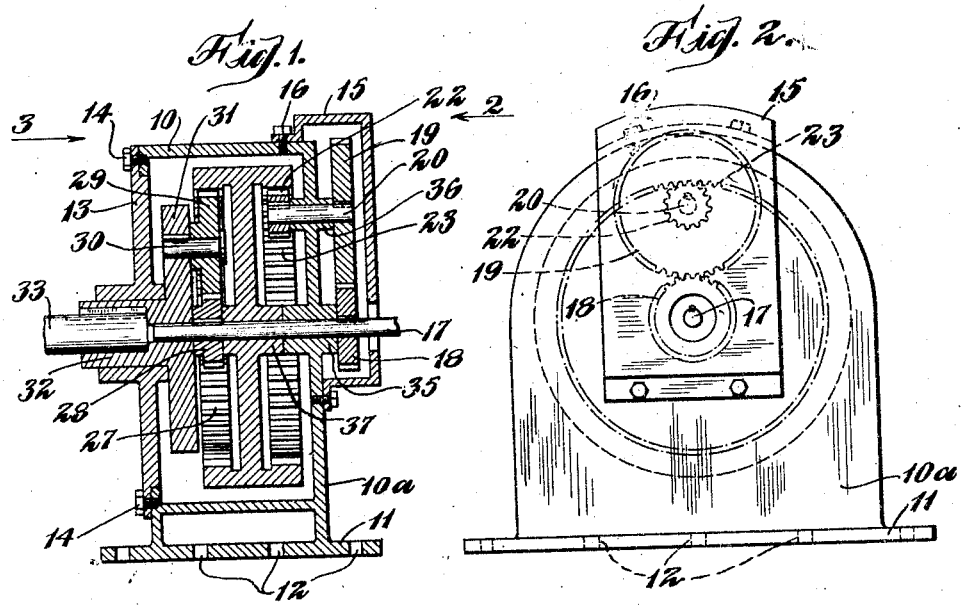
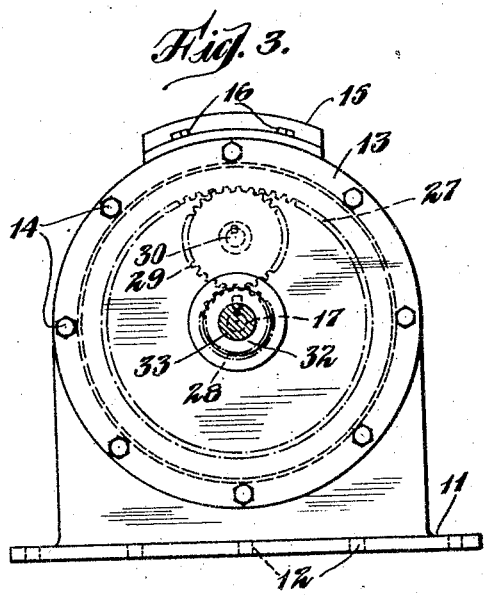
William Natisch Inventor
By his Attorney Martin Joachimson Patented June 29, 1926.

1,590,902

UNITED STATES PATENT OFFICE.

WILLIAM NATISCH, OF MALVERNE, NEW YORK.

UNIVERSAL GEAR-SPEED TRANSFORMER.

Application filed December 31, 1924. Serial No. 759,091.

This invention relates to improvements in gear speed transformers, particularly speed reducing gear arrangements to reduce the high speeds of electric motors and similar drivers to lower working speeds by the use of spur gears which are so arranged, that the driving and the driven shafts are in co-axial alignment with each other, and it is the principal object of the invention to provide a speed changing gear in which the speed of the driving shaft is transmitted to the driven shaft with an exceptionally small number of spur gears, and is greatly reduced.

Another object of the invention is the provision of a speed transformer allowing the changing of the speed variations within a considerable range by the exchange of some of the gears with facility and ease in a short time without disturbing the main gear train or casing.

A further object of the invention is the provision of a speed changing gear of this class with an internal revolving body having two integral gears separated by a central web and in mesh with a plurality of gears on fixed centers, one of which is keyed to a driving plate for the driven shaft.

I obtain these objects by combining two sets of gears, driven by the same shaft, of which one set of gears is adapted to reduce the speed of the driven shaft, and the second set is adapted to either add to the decrease of speed or inhibit the same.

These and further objects and the manner by which they are obtained by my invention, will become more fully apparent as the description thereof proceeds, and will then be particularly specified in the appended claims.

In the accompanying drawing, forming a material part of this disclosure:—

Figure 1 is a sectional side elevation of a speed changing device constructed according to my invention.

Figure 2 is an end view thereof seen in the direction of arrow 2, and

Figure 3 is a similar view of the device seen from the opposite end along arrow 3.

The spur gears forming my speed changing device are arranged within a casing 10 having a flanged foot part 11 provided with a plurality of holes 12 for the passage of suitable fastening means for securing the device to a floor, wall or other suitable support. The front of the casing is closed by a removable cover plate 13 adapted to be secured to the body of the casing by a plurality of bolts 14 or the like.

At its opposite end the casing 10 is closed by a plate 10ª which preferably forms an integral part thereof; this plate carries at its upper part a removable lid or cap 15 equipped with suitable flanges allowing the passage of the fastening bolts, etc., 16.

A driving shaft 17 is journalled in a bearing 35 formed in plate 10ª of the casing and has keyed thereto a pinion 28 which meshes with a gear 29 which revolves on a stud 30. This stud is held by a disk 31, the hub 32 of which is journalled in a bearing formed in plate 13. The driven shaft 33 is keyed into the central aperture of hub 32 and the driving shaft 17 revolves in a smaller extension of the central aperture in hub 32. In this manner hub 32 holds the two shafts in axial alignment with each other. Gear 29 meshes into an internal gear 27 and assuming that this gear stands still, it will by rotation of shaft 17 revolve planetary around pinion 28 driving disk 31 and shaft 33 at a certain reduced speed.

Driving shaft 17 has keyed thereto, outside of the bearing 35 in plate 10ª a pinion 18 in mesh with a gear 19 which is keyed to a short shaft 20 journalled in a bearing 36 of plate 10ª. To this shaft is keyed at its opposite end, within the casing a pinion 22 which meshes into a second internal gear 23. This internal gear 23 shares the same web with internal gear 27 and both have a common hub 37 which may rotate on shaft 17.

It was stated before, that the driven shaft rotates with a certain speed when internal gear 27 stands still. It will be clear however, that by means of gears 18—19—22 and 23 the internal gear 27 can be rotated by rotation of the driving shaft, and that the speed of rotation depends on the ratio of the gears 18—19—22, because the speed of disk 31 is reduced if internal gear 27 turns in the same direction as gear 29, and this is accomplished by these gears. By changing the ratio of gear 18—19, the rotating speed of internal gears 23—27 can be altered and it is possible to bring the driven disk 31 and the driven shaft 33 almost to a standstill.

It will be clear that by this device a great reduction of speed can be accomplished with very few spur gears and that a change of the ratio of speed reduction can easily be made by simply changing gears 18—19 for gear of a different ratio. These gears are located outside of the housing 10 of the gear speed transformer. They are protected by the separable guard 15 and can be quickly removed, and the gears exchanged for gears of a different ratio having the same distance between their axes. This feature is of particular importance in devices of this character, as they are placed on the market as standard articles of manufacture and their ratios of reduction are ranged in certain definite steps which can only be altered to a very limited degree, particularly where internal gears are used in connection with a planetary gear, as any change in size of the latter necessitates a different internal gear, and mostly a casing of different size. The present invention eliminates this difficulty as the possessor of this device may change the ratio of speed transmission from shaft 17 to shaft 33 within a wide range by simply exchanging gears 18 and 19 for gears of different sizes without resorting to any structural alterations. The manufacturer of this device is enabled to furnish transformers almost of any desired ratio without resorting to the manufacture of many stock sizes of the device. Each size can be made to cover many different ratios by equipping it with different gears 18 and 19.

It will be clear that such changes may be made in the general arrangement and in the construction of the minor details of my invention as fall within the scope of the appended claims without departure from the spirit of my invention.

Having thus described my invention, what I claim as new, and desire to secure by Letters Patent is:—

1. In a speed changing device of the kind described, a support, a driving shaft and a driven shaft journaled thereon in co-axial alignment with each other, a pair of spur gears on said driving shaft, a pair of internal gears loosely mounted on said driving shaft, a planetary gear held on said driven shaft meshing into one of said spur gears, a pair of compound gears, one of said internal gears being driven by one of said compound gears, the other compound gear driven by said second spur gear being mounted to form a pair of change gears with the same, and the second internal gear being arranged to drive said planetary gear.

2. In a speed changing device of the kind described, a gear housing, a driving shaft and a driven shaft held in co-axial alignment with each other by journals on said housing, a spur gear on said driving shaft outside of said housing, a second spur gear thereon, a planetary gear meshing into said second spur gear, an internal gear driving said planetary gear, all within said housing, and a pair of compound gears, one of said compound gears being arranged within said housing to drive said internal gear, and the other compound gear being located outside of said housing in mesh with the first named spur gear on said driving shaft.

3. A speed transformer of the kind described comprising a support, a high speed shaft and a low speed shaft arranged on a common axis in journals on said support, two spur gears on said high speed shaft, one being located outside of the journal for said shaft, and the other between said journals, a planetary gear in mesh therewith held on said low speed shaft, an internal gear to drive said planetary gear, and a pair of compound gears, one of said compound gears being adapted to drive said internal gear, and the other meshing into the spur gear located outside of said support to form with the same a pair of change gears for quick alteration of the speed ratio of the transformer.

4. A speed transformer of the kind described comprising a casing, a high speed shaft entering one side of said casing, a low speed shaft arranged on a common axis with said high speed shaft entering the opposite side of said casing, an internal gear, a planetary gear therein driving said low speed shaft, a pinion to drive said planetary gear, and a second pinion to drive said internal gear, all arranged within said casing, a stub shaft for said second pinion journaled on said housing, and a pair of change gears outside of said housing, one of said change gears being mounted on said stub shaft, and the other on said high speed shaft.

5. In a gear speed transformer of the kind described, a casing, a high speed shaft and a low speed shaft held on a common axis in journals on said casing, a sun gear on said high speed shaft, an internal gear, a planetary gear for driving said low speed shaft in mesh with said sun gear and said internal gear, a gear and pinion forming means to rotate said internal gear all enclosed in said casing, and a pair of change gears driven by said high speed shaft outside of said casing, one of said change gears being mounted to drive said pinion.

6. A speed changing device of the kind described comprising a support, a pair of shafts held in journals on said support, a sun gear, an internal gear and a planetary gear, in mesh with each other and mounted to transmit motion from one of said shafts turning at high speed to the other shaft at lower speed, means to rotate said internal gear and a pair of gears driven by said high speed shaft arranged to operate said rotating means and forming means to vary the ratio of speed transmission between said shafts by the exchange of said gears for gears of different diameters.

7. A speed changing device of the kind described comprising a casing holding a pair of shafts in alinement on a common axis, an internal gear rotatably mounted on one of said shafts, a pinion fastened to said shaft, a planetary gear driven thereby rotating within said internal gear, and driving the second shaft at reduced speed, a pair of exchangeable gears on the outside of said casing geared to said internal gear forming means to vary its speed of rotation by replacing said gears by others of different diameters.

8. A speed transformer of the kind described comprising a high speed shaft and a low speed shaft having a common axis, a planetary gear held on one shaft and geared to the other shaft and surrounded by an internal gear loosely mounted on the second one of said shafts, geared means held on said casing to rotate said internal gear and exchangeable means to impart different speeds to said internal gear outside of said casing.

Signed at Brooklyn, in the county of Kings and State of New York this 29 day of December A. D. 1924.

WILLIAM NATISCH.